US00RE38933E

(19) United States
(12) Reissued Patent
Mayer et al.

(10) Patent Number: US RE38,933 E
(45) Date of Reissued Patent: Jan. 10, 2006

(54) METHOD AND CIRCUIT FOR CONVERTING THE IMAGE FORMAT OF THREE-DIMENSIONAL ELECTRONIC IMAGES PRODUCED WITH LINE POLARIZATION

(75) Inventors: Christoph Mayer, Augsburg (DE); Klaus Lockmann, Delbrück (DE)

(73) Assignee: Fujitsu Siemens Computer GmbH, Munich (DE)

(21) Appl. No.: 10/833,992

(22) PCT Filed: Dec. 5, 1997

(86) PCT No.: PCT/DE97/02844

§ 371 (c)(1),
(2), (4) Date: Jun. 18, 1999

(87) PCT Pub. No.: WO98/27746

PCT Pub. Date: Jun. 25, 1998

Related U.S. Patent Documents

Reissue of:
(64) Patent No.: 6,449,003
Issued: Sep. 10, 2002
Appl. No.: 09/331,438
Filed: Dec. 5, 1997

(30) Foreign Application Priority Data

Dec. 18, 1996 (DE) ..... 196 52 803

(51) Int. Cl.
*H04N 13/00* (2006.01)
*H04N 13/04* (2006.01)
*H04N 11/20* (2006.01)

(52) U.S. Cl. ..... 348/43; 348/57; 348/458

(58) Field of Classification Search ..... 348/43, 348/57, 458
See application file for complete search history.

(56) References Cited

U.S. PATENT DOCUMENTS 5,760,827 A * 6/1998 Faris ..... 348/42
5,786,848 A 7/1998 Isobe et al.

FOREIGN PATENT DOCUMENTS

DE 32 34 557 A1 3/1984
DE 32 34 557 C2 8/1984
DE 44 24 702 A1 1/1995
DE 195 31 760 A1 12/1996

OTHER PUBLICATIONS

Ost, Jürgen: Bild–fernspechen, kompatibel mit der Femseh–rundfunknorm, In: Radio Mentos Elektronik, 1975, Nr. 5, S. 194–196.

* cited by examiner

*Primary Examiner*—Vu Le
*Assistant Examiner*—David J Czekaj
(74) *Attorney, Agent, or Firm*—Schiff Hardin LLP

(57) ABSTRACT

A method and circuit for converting the image format of three-dimensional electronic images produced with line polarization wherein, given that television pictures are transmitted with different line resolution and displayed on devices whose line resolution does not coincide with the line resolution of the transmitted images, lines are not only respectively inserted or skipped, but also transposed with one another.

8 Claims, 10 Drawing Sheets

*FIG. 2a*

| GROUP ASSIGN-MENT | | PAL-LINES | PAL-LINES LINE POLARITY | INSERTED PAL-LINES | INSERTED PAL-LINES LINE POLARITY | HDTV-LINES | HDTV-LINES LINE POLARITY | PAL-LINES TOTAL AFTER LINE TRANS-POSITION | PAL-LINES LINE POLARITY AFTER LINE TRANSPOSITION |
|---|---|---|---|---|---|---|---|---|---|
| G | g | 1 | H | 1' | H | 1<br>2 | H<br>V | 1<br>2 | H<br>V |
| | g | 2 | V | 2' | V | 3<br>4 | H<br>V | 1'<br>2' | H<br>V |
| G | g | 3 | H | 3' | H | 5<br>6 | H<br>V | 3<br>4 | H<br>V |
| | g | 4 | V | 4' | V | 7<br>8 | H<br>V | 3'<br>4' | H<br>V |
| G | g | 5 | H | 5' | H | 9<br>10 | H<br>V | 5<br>6 | H<br>V |
| | g | 6 | V | 6' | V | 11<br>12 | H<br>V | 5'<br>6' | H<br>V |
| G | g | 7 | H | 7' | H | 13<br>14 | H<br>V | 7<br>8 | H<br>V |
| | g | 8 | V | 8' | V | 15<br>16 | H<br>V | 7'<br>8' | H<br>V |
| | g | 9 | H | | | 17 | H | 9 | H |

FIG. 2b

| GROUP ASSIGN-MENT | | PAL-LINES | PAL-LINES LINE POLARITY | INSERTED PAL-LINES | INSERTED PAL-LINES LINE POLARITY | HDTV-LINES | HDTV-LINES LINE POLARITY | PAL-LINES TOTAL AFTER LINE TRANS-POSITION | PAL-LINES LINE POLARITY AFTER LINE TRANSPOSITION |
|---|---|---|---|---|---|---|---|---|---|
| G | | | | 617' | H | 1234 | V | 618 | V |
| | g | 618 | V | 618' | V | 1235<br>1236 | H<br>V | 617'<br>618' | H<br>V |
| G | g | 619 | H | 619' | H | 1237<br>1238 | H<br>V | 619<br>620 | H<br>V |
| | g | 620 | V | 620' | V | 1239<br>1240 | H<br>V | 619'<br>620' | H<br>V |
| G | g | 621 | H | 621' | H | 1241<br>1242 | H<br>V | 621<br>622 | H<br>V |
| | g | 622 | V | 622' | V | 1243<br>1244 | H<br>V | 621'<br>622' | H<br>V |
| G | g | 623 | H | 623' | H | 1245<br>1246 | H<br>V | 623<br>624 | H<br>V |
| | g | 624 | V | 624' | V | 1247<br>1248 | H<br>V | 623'<br>624' | H<br>V |
| G | g | 625 | H | 625' | H | 1249<br>1250 | H<br>V | 625<br>L | H<br>V |
| | f | L | | | | | | 625' | H |

FIG. 3

| GROUP ASSIGN-MENT | | HDTV-LINES | HDTV-LINES LINE POLARITY | HDTV-LINES TO BE SKIPPED | PAL-LINES | PAL-LINES LINE POLARITY |
|---|---|---|---|---|---|---|
| G | g | 1<br>2 | H<br>V | | 1<br>2 | H<br>V |
| | g | 3<br>4 | H<br>V | X<br>X | | |
| G | g | 5<br>6 | H<br>V | | 3<br>4 | H<br>V |
| | g | 7<br>8 | H<br>V | X<br>X | | |
| G | g | 9<br>10 | H<br>V | | 5<br>6 | H<br>V |
| | g | 11<br>12 | H<br>V | X<br>X | | |
| G | g | 13<br>14 | H<br>V | | 7<br>8 | H<br>V |
| | g | 15<br>16 | H<br>V | X<br>X | | |
| G | g | 17<br>1234 | H<br>V | | 9<br>617 | H<br>V |
| | g | 1235<br>1236 | H<br>V | X<br>X | | |
| G | g | 1237<br>1238 | H<br>V | | 618<br>619 | H<br>V |
| | g | 1239<br>1240 | H<br>V | X<br>X | | |
| G | g | 1241<br>1242 | H<br>V | | 620<br>621 | H<br>V |
| | g | 1243<br>1244 | H<br>V | X<br>X | | |
| G | g | 1245<br>1246 | H<br>V | | 622<br>623 | H<br>V |
| | g | 1247<br>1248 | H<br>V | X<br>X | | |
| G | g | 1249<br>1250 | H<br>V | | 624<br>625 | H<br>V |
| | f<br>f | L | | | | |

FIG. 4a

| GROUP ASSIGN-MENT | | PAL-PLUS LINES | PAL-PLUS-LINES LINE POLARITY | INSERTED PAL PLUS LINES | INSERTED PAL PLUS LINES LINE POLARITY | PAL-LINE | PAL-LINES LINE POLARITY | PAL PLUS LINES TOTAL AFTER TRANS-POSITION | PAL PLUS LINES LINE POLARITY AFTER TRANSPOSITION |
|---|---|---|---|---|---|---|---|---|---|
| G | g | 1 | H | | | 1 | H | 1 | H |
| | | | | 1' | H | 2 | V | 2 | V |
| | | 2 | V | | | 3 | H | 1' | H |
| | | | | 2' | V | 4 | V | 2' | V |
| | | 3 | H | | | 5 | H | 3 | H |
| | | 4 | V | | | 6 | V | 4 | V |
| | | 22 | V | | | 24 | V | 22 | V |
| | | 23 | H | | | 25 | H | 23 | H |
| | g | 24 | V | | | 26 | V | 24 | V |
| | | | | 24' | V | 27 | H | 25 | H |
| | | 25 | H | | | 28 | V | 24' | V |
| | | | | 25' | H | 29 | H | 25' | H |
| | | 26 | V | | | 30 | V | 26 | V |
| | | 27 | H | | | 31 | H | 27 | H |
| | | 45 | H | | | 49 | H | 45 | H |
| | | 46 | V | | | 50 | V | 46 | V |
| G | g | 47 | H | | | 51 | H | 47 | H |
| | | | | 47' | H | 52 | V | 48 | V |
| | | 48 | V | | | 53 | H | 47' | H |
| | | | | 48' | V | 54 | V | 48' | V |
| | | 49 | H | | | 55 | H | 49 | H |

*FIG. 4b*

| GROUP ASSIGN-MENT | | PAL-PLUS LINES | PAL-PLUS-LINES LINE POLARITY | INSERTED PAL PLUS LINES | INSERTED PAL PLUS LINES LINE POLARITY | PAL-LINE | PAL-LINES LINE POLARITY | PAL PLUS LINES TOTAL AFTER TRANS-POSITION | PAL PLUS LINES LINE POLARITY AFTER TRANSPOSITION |
|---|---|---|---|---|---|---|---|---|---|
| | | 551 | H | | | 599 | H | 551 | H |
| | | 552 | V | | | 600 | V | 552 | V |
| | | 553 | H | | | 601 | H | 553 | H |
| | | | | 553' | H | 602 | V | 554 | V |
| | | 554 | V | | | 603 | H | 553' | H |
| | | | | 554' | V | 604 | V | 554' | V |
| | g | 555 | H | | | 605 | H | 555 | H |
| | | 556 | V | | | 606 | V | 556 | V |
| | | 574 | V | | | 624 | V | 574 | V |
| G | | 575 | H | | | 625 | H | 575 | H |
| | | L | | | | | | | |
| | f | L | | | | | | | |
| | | L | | | | | | | |

FIG. 5a

| GROUP ASSIGN-MENT | | Sys500-LINES | Sys500-LINES POLARITY | INSERTED LINES | INSERTED LINES LINE POLARITY | Sys800-LINES | Sys800-LINES LINE POLARITY | Sys500-LINES TOTAL AFTER TRANS-POSITION | Sys500-LINES LINE POLARITY AFTER TRANSPOSITION |
|---|---|---|---|---|---|---|---|---|---|
| G | g | 1 | H | | | 1 | H | 1 | H |
| | | | | 1' | H | 2 | V | 2 | V |
| | | 2 | V | | | 3 | H | 1' | H |
| | | | | 2' | V | 4 | V | 2' | V |
| | | 3 | H | | | 5 | H | 3 | H |
| | | 4 | V | | | 6 | V | 4 | V |
| | | 5 | H | | | 7 | H | 5 | H |
| | | | | 5' | H | 8 | V | 6 | V |
| | g | 6 | V | | | 9 | H | 5' | H |
| | | | | 6 | V | 10 | V | 6' | V |
| | | 7 | H | | | 11 | H | 7 | H |
| | | 8 | V | | | 12 | V | 8 | V |
| | | 9 | H | | | 13 | H | 9 | H |
| | | | | 9' | H | 14 | V | 10 | V |
| | | 10 | V | | | 15 | H | 9' | H |
| | | | | 10' | V | 16 | V | 10' | V |
| G | g | 11 | H | | | 17 | H | 11 | H |
| | | | | 11' | H | 18 | V | 12 | V |
| | | 12 | V | | | 19 | H | 11' | H |
| | | | | 22' | V | 36 | V | 22' | V |
| | | 23 | H | | | 37 | H | 23 | H |

FIG. 5b

| GROUP ASSIGN-MENT | | Sys500-LINES | Sys500-LINES POLARITY | INSERTED LINES | INSERTED LINES LINE POLARITY | Sys800-LINES | Sys800-LINES LINE POLARITY | Sys500-LINES TOTAL AFTER TRANS-POSITION | Sys500-LINES LINE POLARITY AFTER TRANSPOSITION |
|---|---|---|---|---|---|---|---|---|---|
| | | 490 | V | | | 783 | H | 489' | H |
| | | | | 490' | V | 784 | V | 490' | V |
| G | g | 491 | H | | | 785 | H | 491 | H |
| | | | | 491' | H | 786 | V | 492 | V |
| | | 492 | V | | | 787 | H | 491' | H |
| | | | | 492' | V | 788 | V | 492' | V |
| | | 493 | H | | | 789 | H | 493 | H |
| | | 494 | V | | | 790 | V | 494 | V |
| | | 495 | H | | | 791 | H | 495 | H |
| | | | | 495' | H | 792 | V | 496 | V |
| | g | 496 | V | | | 793 | H | 495' | H |
| | | | | 496' | V | 794 | V | 496' | V |
| | | 497 | H | | | 795 | H | 497 | H |
| | | 498 | V | | | 796 | V | 498 | V |
| | | 499 | H | | | 797 | H | 499 | H |
| | | | | 499' | H | 798 | V | 500 | V |
| | | 500 | V | | | 799 | H | 499' | H |
| | | | | 500' | V | 800 | V | 500' | V |

FIG. 8
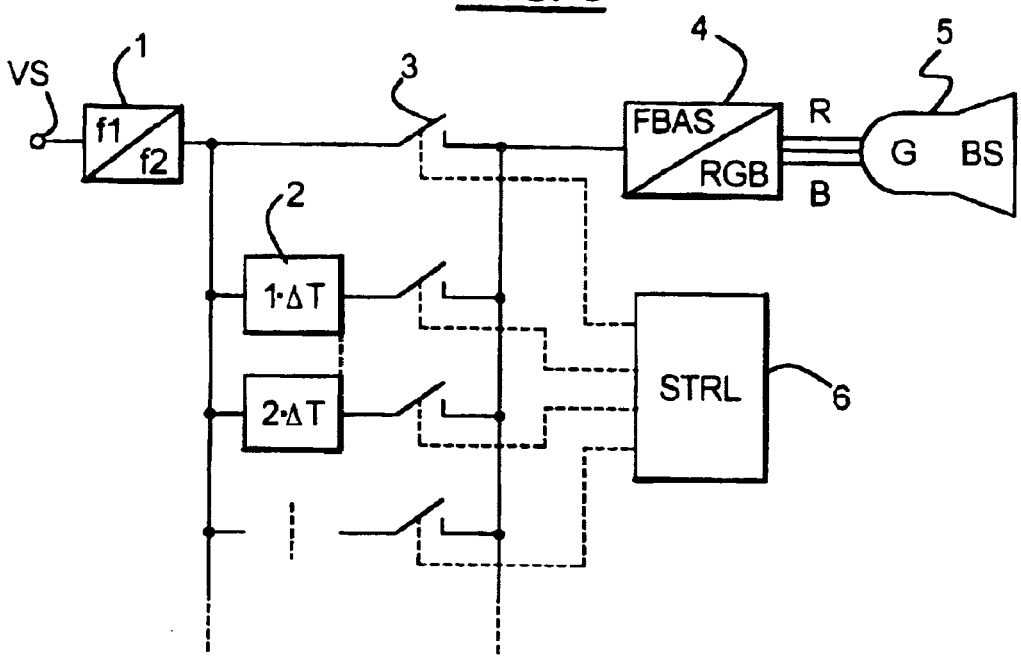
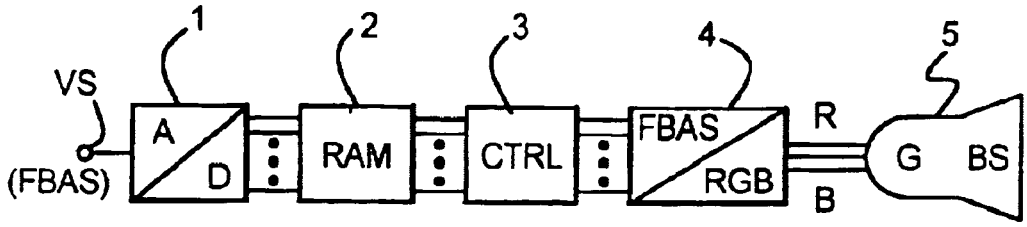
FIG. 9

METHOD AND CIRCUIT FOR CONVERTING THE IMAGE FORMAT OF THREE-DIMENSIONAL ELECTRONIC IMAGES PRODUCED WITH LINE POLARIZATION

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a method and circuit for converting the image format of n-line, three-dimensional electronic images produced with line polarization into m-line images whose respective, immediately neighboring two lines are respectively polarized in alternation into first and second directions upon viewing, wherein all lines polarized in the first direction are employed for the presentation of a first sub-image and all lines polarized in the second direction are employed for the presentation of a second sub-image.

2. Description of the Prior Art

The line polarization method utilizes the interface method in television transmission. In the interface method, a first and a second field are always transmitted in alternation, these being combined in a comb-like fashion to form an image.

Two images, one for each of the eyes of the person, are needed in three-dimensional viewing, these being offset relative to one another in conformity with the respectively different viewing angle of each eye relative to the motive. The two fields in the television transmission can respectively present one of these images, whereby one field is polarized in a first direction and the other field is polarized in a second direction. This, for example, can be achieved with a polarization filter on the field pane of the image presentation device that polarizes the individual lines into the one and other direction in alternation. When this is the case, one can view three-dimensionally with corresponding eyeglasses that filter out the one image for the one eye and the other image for the other eye.

The different resolution standards in which images are transmitted represent a current problem. Known resolution standards are, for example, 625 lines in the PAL transmission method, 1250 lines in the HDTV transmission method and 575 lines in the PAL plus transmission method. When an electronic image presentation device is designed for one of these standards and this same image presentation device is also prepared to polarize the individual presentation lines into the one and other direction in alternation for three-dimensional image presentation, a three-dimensional image transmitted in a different resolution standard can no longer to presented. The reason for this is because allocation of polarized lines of the image presentation device and the transmitted fields no longer coincides.

The publication by Jugen Ost, "Bildfernsprechen, kompatibel mit de Fernsebrundfunknorm," In Radio Mentos Electronik, 1975, No. 5, pages 194–196, discloses a method for converting the image format of 313-line electronic images into 625-line images by repeating every line. No measures are addressed in order to be able to produce three-dimensional images in the conversion with line polarization.

German patent document DE 32 34 557 C2 describes a "1250/100/4:1 standard" that is intended to enable HDTV and 3D reproduction. This standard is based on the fact that frames are respectively composed of four sub-images that are written on a color television screen in mutually offset grids with a sub-image frequency corresponding to twice the power supply frequency.

It is therefore an object of the invention to specify a method and circuit arrangements for the conversion of the image format of three-dimensional electronic images produced with line polarization.

SUMMARY OF THE INVENTION

Accordingly, pursuant to the method and circuit of the present invention, a correct allocation of transmitted fields to the polarized lines of the image presentation device is always established regardless of the resolution standard with which the images are transmitted and displayed. Missing lines are supplemented. Too many lines are skipped. The correct allocation of the transmitted image lines to the respective, polarized presentation lines, finally is obtained by a line transposition when necessary.

Accordingly, in an embodiment of the present invention, a method is provided for converting an image format of n-line, three-dimensional electronic images produced with line polarization into m-line images whose respective, immediately neighboring two lines are respectively polarized in alternation into a first and second direction upon viewing, wherein all lines polarized in the first direction are employed for the presentation of a first sub-image and all lines polarized in the second direction are employed for the presentation of a second sub-image, given that the first and second sub-images are needed for three-dimensional viewing, the method including the steps of: abbreviating as a whole number a fraction formed of the values n and m having the form m/n to form m'/n'; dividing the lines of the image to be converted into first groups having a respective line plurality n'; combining two of the first groups which abut one another to respective second groups, wherein a last first group remaining by itself is combined with an imaginary dummy group of the same size having nothing but dummy lines to form a last second group; determining |p| lines to be inserted, if m'>n', twice per respective second group in the conversion according to an equation |p|=|m'−n'|; determining |p| lines to be skipped, if m'<n', twice per respective second group in the conversion according to the equation |p|=|m'−n'|; inserting |p| lines, if m'>n', twice in each of the second group wherein two successive lines are always affected by an insertion and, given an odd-numbered |p|, the last line not yet affected by an insertion is affected by an insertion in the one first group in a meeting area of the first groups abutting one another in a respective second group, and the first line not yet affected by an insertion is affected by an insertion in the other group; [inserting] *skipping* |p| lines, if [m'>n'] *m'<n'*, twice in each of the second group wherein two successive lines are always affected by a skipping and, given an odd-numbered |p|, the last line not yet affected by a skipping is affected by a skipping in the one first group in a meeting area of the first groups abutting one another in a respective second group, and the first line not yet affected by a skipping is affected by a skipping in the other group; and transposing with one another in sequence the two inward lines of the four-line groups respectively arising after an addition of lines to two successive lines of the second group.

In an embodiment of the method, the inserted lines are copied from preceding or following lines.

In an embodiment of the method, the inserted lines are interpolated from preceding and succeeding lines.

In an embodiment of the method, the lines within a second group affected by an insertion or a skipping are selected uniformly distributed within the respective second group.

In an embodiment of the method, the lines polarized in the one direction are shifted relative to one another in a plane compared to the lines polarized in the other direction.

In an embodiment, the method further includes the steps of setting a mode, wherein each even-numbered or odd-numbered line is overwritten with the content of a preceding line, for switching from a three-dimensional image to a two-dimensional image.

In a further embodiment of the present invention, a circuit is provided for presenting a three-dimensional image electronically generated upon application of a line polarization method from a video signal adjacent an input, the circuit including: a frequency converter having a set frequency which defines a plurality of presented lines; at least one parallel delay line exhibiting an independent delay value and having a controlled switch for activating or deactivating the respective delay line provided for the image presentation; and control electronics for controlling switches, wherein image lines are transposed as warranted and controls for the switches of the delay lines are provided.

In yet another a further embodiment of the present invention, a circuit is provided for presenting a three-dimensional image electronically generated upon application of a line polarization method from a video signal adjacent an input, the circuit including: a digital write-read memory for simultaneously storing at least one three-dimensional image to digital form; and a controller circuit, the controller circuit for fetching the stored images at a rate dependent on the storing, wherein stored lines are read out in a different sequence and forwarded for image presentation.

Additional features and advantages of the present invention are described in, and will be apparent from, the Detailed Description of the Preferred Embodiments and the Drawing.

DESCRIPTION OF THE DRAWING

FIG. 2 shows a second table with the indication of line allocations according to the present invention given a change of the image resolution from a PAL system to a HDTV system;

FIG. 3 shows a third table with the indication of line allocations according to the present invention given a change of the image resolution from a HDTV system to a PAL system;

FIG. 4 shows a fourth table with the indication of line allocations according to the present invention given a change of the image resolution from a PAL plus system to a PAL system;

FIG. 5 shows a fifth table with the indication of line allocations according to the present invention given a change of the image resolution from a system having 500 lines to a system having 800 lines;

FIG. 8 shows a schematic circuit diagram for an analog resolution conversion of electronically generated images according to the present invention; and FIG. 9 shows a schematic circuit diagram for a digital resolution conversion of electronically generated images of the present invention.

DETAILED DESCRIPTION OF THE PREFERRED EMBODIMENTS

Figure 1:
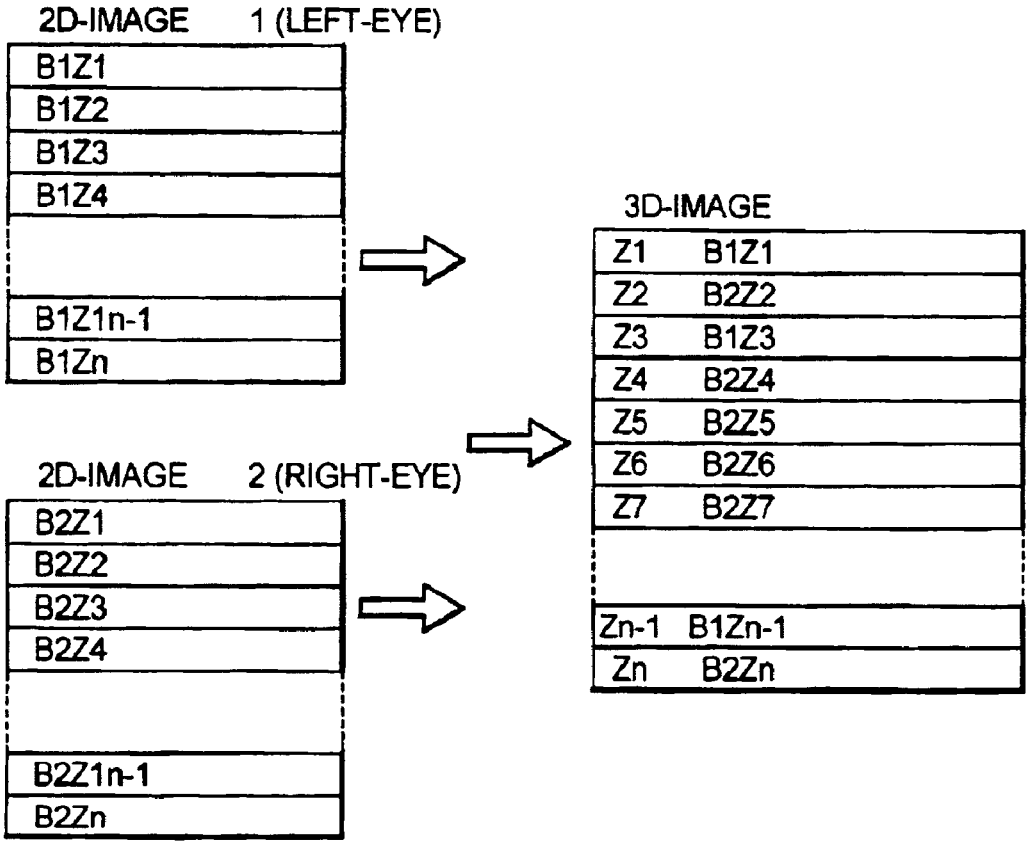
FIG. 1 shows a first table with the indication of line allocations for the presentation of a three-dimensional image with a maximum image resolution.

FIG. 1 shows two two-dimensional fields 2D-Field 1 and 2D-Field 2. Each of these fields exhibits the same line resolution of Zn lines. The line resolution of Zn lines corresponds to the line resolution of the electronic image presentation device that respectively two-dimensional fashion, displays as one of these fields. What is thereby to be understood as an electronic image presentation device is, for example, a picture tube device or a LCD flat picture screen device. Only a picture screen shall be mentioned below.

When one of these fields is displayed on a picture screen, this field appears in the full picture screen resolution because all lines of the respective field are displayed. The two fields 2D-Field 1 and 2D-Field 2 shown in FIG. 1 thus do not differ in this respect from images of a two-dimensional film. In order to enable three-dimensional viewing, the lines of the picture screen must be line-polarized. One possibility of line polarization is to polarize the lines with odd line numbers in the one direction and the lines with even line numbers in the other direction. This can be achieved, for example, with a corresponding polarization film that is applied on the picture screen. When a viewer has a second filter, for example polarization eyeglasses with a first polarized glass corresponding to the polarization direction of the one of the polarization directions of the polarization film of the picture screen and having a second polarized glass corresponding to the polarization direction of the other of the two polarization directions of the polarization film of the picture screen, he can view three-dimensionally. Fields for the one eye are respectively presented on the picture screen on the one polarized lines and fields for the other eye are displayed of the other polarized lines.

The line polarization method seems to halve the picture screen resolution. In fact, the eye of a person hardly notices this difference when, for producing, three-dimensional image 3D-image, two fields having the same resolution as the 3D picture screen are employed, whereby the odd lines of the one field, for example of the 2D-Field 1, are employed for the left eye for the three-dimensional presentation and the even-numbered lines of the other field, for example of the 2D-Field 2, are employed for the right eye.

FIG. 1 presents this situation [[ ]], whereby, for example, a 3D-image derives whose first line Z1 represents the first line of the 2D-Field 1, namely B1Z1, whose second line Z2 represents the second line of the 2D-Field 2, namely B2Z2, whose third line Z3 represents the third line of the 2B-Field 1, namely B1Z3, whose fourth line Z4 represents the fourth line of the 2D-Field 2, namely B2Z2, etc., until the penultimate line Zn-1 that represents the penultimate line of the 2D-Field 1, namely B1Zn-1, and last line Zn that represents the last line of the 2D-Field 2, namely B2Zn.

A current problem is represented by the fact that video pictures are no longer transmitted and presented in only a single standard. On the contrary, there are currently several standards for transmission and presentation, and extensive use is currently made of these different standards. In order to be compatible with the various standards, it is necessary to be able to adapt. When, for example, images are transmitted in the one standard but are to be presented in the other standard, a corresponding conversion of the images is necessary.

FIG. 2 shows an example of a conversion of three-dimensional images that are transmitted in what is referred to as the PAL system and that are presented with a picture screen suitable for what is referred to as a HDTV presentation. Other Figures show other examples of conversions. In the PAL system, the fields are transmitted with a resolution of 625 lines, whereas a picture screen with HDTV resolution displays the fields with 1250 lines. It is assumed—and this is also valid for the other [converging [sic]] *converting* examples—that two fields for the respectively one and the other eye are contained in every transmitted, three-dimensional image. The field for the one eye is thereby transmitted in the lines of the one line polarization and the field for the other eye is transmitted in the lines having the other line polarization.

The various line polarizations are identified in FIG. 2, as well as in the other appertaining Figures, with two letters H and V. The letters H and V stand for horizontal and vertical. Horizontal means that these lines are to be horizontally polarized. Vertical means that the lines [[sic]] are to be vertically polarized. It is critical that two successive lines are always polarized in alternation in the one and other direction.

FIG. 2 shows a number of columns that are differently labeled. A first column is labeled "group allocation", a second is labeled "PAL lines", a third is labeled "PAL lines, line polarity", a fourth is labeled "inserted PAL lines", and fifth is labeled "inserted PAL lines, line polarity", a sixth is labeled "HDTV lines", a seventh is labeled "HDTV lines, line polarity", an eighth is labeled "PAL lines overall, after line transposition", and a ninth is labeled "PAL lines, line polarity following line transposition". This column division is analogously employed in the following exemplary embodiments.

Columns 2 and 3 refer to that system from which the conversion is to be implemented. Columns 6 and 7 refer to that system into which the conversion is to be implemented. The line numbers and the respectively appertaining polarization directions are respectively indicated. Columns 4 and 5 indicate what lines with which polarization direction are to be inserted.

Only one column is indicated in FIG. 3 at this location, for which reason the following columns exhibit a number lower by one compared to the other Figures. In detail, this means that columns 6 and 7 in FIG. 3 are columns 5 and 6. It is important to consider this detail given a comparison of the various Figures with one another.

Compared to the other Figures, it is also not indicated in column 4 of FIG. 3 what lines are to be inserted. What is indicated, instead, is what lines are to be skipped. FIG. 3 is not a matter of a line expansion but of a line reduction. Since FIG. 3 is a matter of a line reduction, the new system already results from the remaining lines of the initial system. Columns 8 and 9, which would be columns 7 and 8 in FIG. 3, are therefore omitted from FIG. 3.

As already mentioned, FIG. 2 is based on the conversion from a PAL system to an HDTV system. Lines 1 through 625 having H and V polarized in alternation are therefore to be converted into lines 1 through 1250 which likewise have lines polarized H and V in alternation. The initial system thus includes n lines, whereas the destination system includes m lines.

For accomplishing the conversion, it is necessary to combine the n initial lines into first groups g. The size of the first groups g is determined by the number n' that proceeds from the quotient m'/n', whereby the quotient m'/n', in turn, proceeds from the maximally abbreviated quotient m/n.

The following allocation therefore applies in the exemplary embodiment according to FIG. 2; m/n=1250/625. The fraction m'/n' abbreviated with 625=2/1, it follows therefrom that n' is equal to 1.

The first group g therefore respectively includes one line.

In a further method step, respectively two successive, first groups g are combined to a respective second group G. With an initial line number of 625 and respective two-line, second groups G, the last first groups g remains without a second first group g. In order to be able to form a second group G with this first group g, it is necessary to temporarily introduce an imaginary first group f that includes a line plurality corresponding to a regular first group g but respectively without content. The lines of the imaginary group f are what are referred to as dummy lines L, i.e., these lines do not serve for a transmission of image information but only serve the purpose of being able to apply the general conversion method in every method stage. As the present exemplary embodiment shows, special rules would otherwise have to be adhered to in some instances in order to ultimately arrive at the final result.

How many lines [[six]] must be inserted or, respectively, skipped in the conversion must now be checked no later than after the initial lines have been divided into second groups G. Lines must be inserted when a conversion is to occur toward a greater plurality of lines. Lines must be skipped when a conversion is to occur to a smaller plurality of lines.

The relationship $|p|=m'-n'$ indicates how many lines must be inserted or, respectively, skipped by halves per second groups G. "By halves" means that $2*|p|$ must be inserted or, respectively, skipped per second group G in the exemplary embodiment of FIG. 2 as $2*1=2$ lines. The operational sign of the difference $m'-n'$ thereby indicates whether lines must be inserted or skipped. Lines are to be inserted given a positive difference and lines are to be skipped given a negative difference.

In the exemplary embodiment of FIG. 2 $|p|=1$ and $m'-n'=+1$ applied, i.e., two lines must be inserted per second group G. Independently of the plurality of lines to be inserted or, respectively, to be skipped per second groups G, two successive lines must be respectively affected by an insertion or, a skipping. According to FIG. 2, only two lines are contained in the second groups G and respectively two lines must be inserted, so that respectively every line is affected by an insertion in every second group G.

FIG. 4 shows an example according to which four lines are to be inserted in every second group G. The second groups G are thereby respectively composed of two first groups g that cover 23 lines.

FIG. 5 shows an example according to which six lines are to be inserted into every second group G. The second groups are thereby respectively composed of two first groups g that respectively cover five lines.

However, an insertion or a skipping of lines nonetheless respectively covers two successive lines. It is to be noted that, given an odd-numbered $|p|$, the pair of lines to be inserted or, respectively, to be skipped determined by $2*|p|$ is divided in such a way that, in the meeting area of the two first groups g abutting one another within a second group G, the last line not yet affected by an insertion or, respectively, a skipping is affected in the one first group g on the one hand and the first line not yet affected by an insertion or, respectively, a skipping in the other first group g on the other hand is affected by an insertion or, respectively, a skipping. Otherwise, the paired lines within the second group G can be arbitrarily selected.

As already mentioned, each line within a second group G is affected by an insertion in the exemplary embodiment according to FIG. 2. This is indicated in columns 4 and 5, whereby the inserted lines are referenced 1' through 625'. The polarization direction on which the respective, inserted line is based is respectively indicated next to this. In detail, the PAL line 1'having the polarization direction H is inserted following the PAL line 1 having the polarization direction H, etc., until the last PAL line 625 having the polarization direction H after which the PAL line 625' having the polarization direction H is inserted.

According to an advantageous development of the present invention, the inserted lines can be a matter either of a copy of a respectively preceding line or of a line interpolated from a preceding and a following line. The polarization corresponds to the copied or to the preceding line.

After lines have been inserted, a conversion is, in fact, established in terms of the plurality of lines but not in terms of the alternating polarization.

In order to obtain the correct, alternating polarization, the two inward lines of four-line groups that are composed of the two lines affected by an insertion and of the two inserted lines must be respectively mutually interposed in their sequence as a final step. In FIG. 2, as in FIGS. 4 and 5, this can be seen from the last columns 8 and 9. The lines respectively affected by a transposition are thereby identified by underlining.

The conversion has been ended after the line transposition method. As a result of the conversion method, a dummy line has been derived as in [[ . . . ]] the last line in FIG. 2, but this is hardly felt in reality. The dummy line derives from the appended, imaginary first group f that connects to the picture screen presentation area. The end of the picture screen presentation area is marked by a double line. Due to the necessary line transposition over the boundary of the picture screen presentation area, the dummy line L entered into the picture screen presentation area. By contrast thereto, the last inserted line 625' has dropped out of the picture screen presentation area. However, the transposition of the lines is necessary in order to obtain the correct polarization line in the picture screen presentation area.

FIG. 4 and FIG. 5 corresponds to FIG. 2, with the difference that a conversion from a PAL plus image having 575 lines onto a PAL image having 625 lines is assumed by way of example in FIG. 4, and a conversion from an image having 500 lines assumed by way of example onto an image having 800 lines assumed by way of example is implemented in FIG. 5. In FIG. 4, the first groups g therefore include 23 lines and includes 5 lines in FIG. 5. An imaginary group f is, in fact, to be assumed at the end of the picture screen presentation area in FIG. 4 but this has no influence. Such an imaginary group is not necessary in FIG. 5 since the plurality of first groups g is even-numbered. Imaginary groups are therefore needed only in reality when the plurality of first group g and |p| are respectively odd-numbered. In this sense, FIG. 4 is an example for an odd-numbered plurality of first groups and an even-numbered |p|. FIG. 5, by contrast, is an example of an even-numbered plurality of first groups and an odd-numbered |p|.

The special characteristic given an odd-numbered |p| is the fact that, given line insertion within a second group G, the last line of the first group g belonging to the appertaining second group G that was not yet affected by an insertion or by a skipping of a line, and the first line of the other first group g belonging to the appertaining second group G that was likewise not yet affected by an insertion or skipping of a line, is affected by insertion or, respectively, a skipping in any case.

What is thus important here is the fact that, in the line insertion—which, of course, must always occur doubly—, the one line insertion is to occur in the one first group g and the other line insertion is to occur in the other first group g of a second group G. What must thus be satisfied overall is that two successive lines are always affected by a line insertion.

With reference to FIG. 5 wherein lines 1, 2, 5, and 6, 9 and 10 are affected by a line insertion, for example, the lines 3 and 4, 5 and 6 and 7 and 8 could also be affected by a line insertion without infringing the required criteria.

It is advantageous, however, to distribute lines to be inserted within the second groups G such that an optimally uniform division of inserted lines derives overall. The analogous case applies to the admission of lines. FIG. 3 indicates an example wherein the conversion is composed of an omission of lines.

A conversion from an HDTV image having 1250 lines to a PAL image having 625 lines is implemented in FIG. 3. According to the above-described demands, first groups g having two lines drive here and two lines must be skipped per second group G. Since it also must be taken into consideration that two successive lines always must be affected by a line insertion or, respectively, a line skipping, the diagram of FIG. 3 can be ultimately utilized to implement the conversion from the one system into the other system. To that end, the last two lines of the second group G have been selected in FIG. 3. However, the middle two lines to the first lines also could also have been selected. A limitation to the respectively first, middle or last two lines per second group G is not compulsory, but is advantageous due to the uniform distribution and the better image that is thus acquired.

Figure 6:
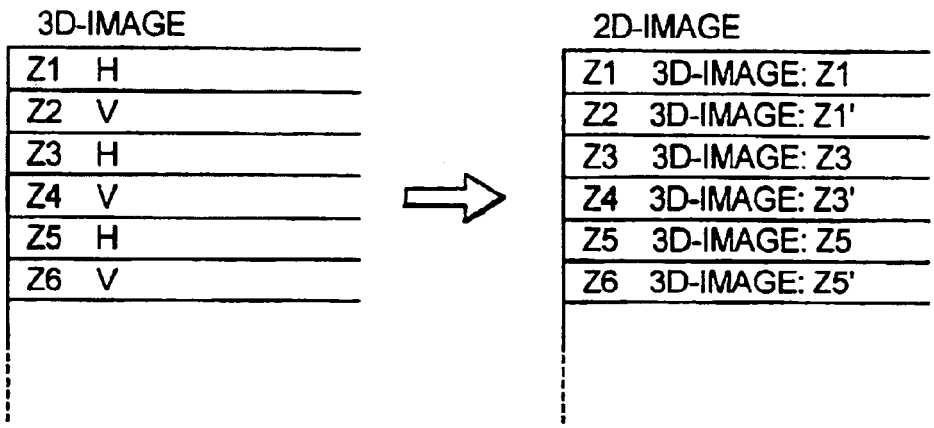
FIG. 6 shows a sixth table with the indication of line allocations given a change from a three-dimensional image to a two-dimensional image.

FIG. 6 shows an example of a conversion from a three-dimensional image into a two-dimensional image. Since the plurality of lines remains constant here, it is sufficient when, for example, every odd-numbered or every even-numbered line is copied. The line polarization thereby plays no part.

Figure 7:
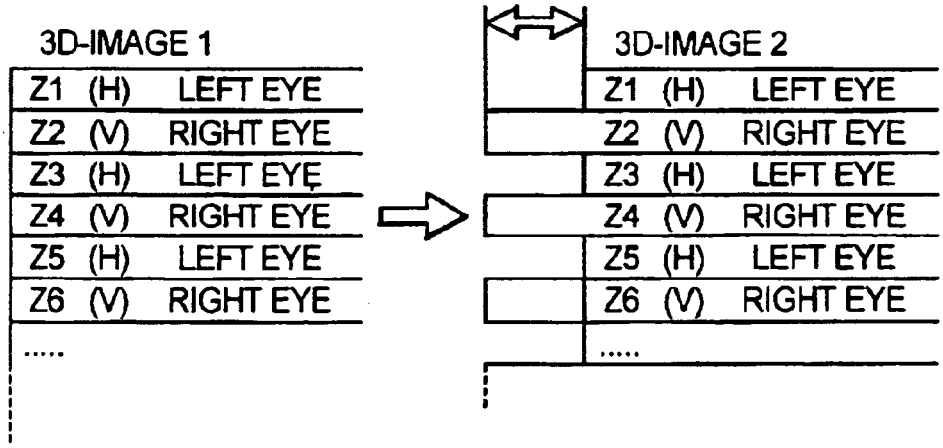
FIG. 7 shows a table with the indication of line allocations and the line beginnings for setting a three-dimensional viewing effect given a three-dimensional image.

FIG. 7 shows how the three-dimensional viewing effect can be influenced given a three-dimensional image [[sic]] generated with the line polarization method. By shifting the lines for the field of the one eye relative to the lines for the field of the other eye, the depth effect given three-dimensional viewing is enhanced to a certain extent and vice versa.

FIGS. 8 and 9 show schematic circuit diagrams of circuit arrangements with which the conversion of three-dimensional images from one line resolution to another line resolution can be implemented according to the above-disclosed method. FIG. 8 thereby shows an exemplary embodiment for an analog circuit arrangement, whereas FIG. 9 shows an exemplary embodiment for a digital circuit arrangement.

In FIG. 8, a conversion of the line plurality is implemented in a frequency converter 1 by a frequency switching from, for example, the frequency f1 to the frequency f2. Electronic switches 3 that switch signals having a predetermined time delay onto the output 4, 5 with at least one delay line 2 are actuated with the control electronics 6. Respectively one signal is thereby switched at the same time. It is thereby possible to double ($1*\nabla T$) lines or to transpose ($2*\nabla T$) lines.

In FIG. 9, the input signal VS is digitalized and at least one image is deposited in the RAM memory 2 at the same time. With the controller 3, the stored images are fetched at a rate independent of the storing and are forwarded to the digital-to-analog converter 4 that generates a video signal with a new resolation therefrom and forwards it to the picture screen S. For the 3D conversion in conjunction with the line polarization, the stored lines are also fetched from the memory in a different sequence by the controller 3. As a result, the line doubling and transposition is realized.

Gives a purely digital system wherein the video signal VS is already present in digitalized form and wherein the picture screen 5 can also process digital signals, the components 1 and 4 can be eliminated.

Although the present invention has been described with reference to specific embodiments, those of skill in the art will recognize that changes may be made thereto without departing from the spirit and scope of the invention as set forth in the hereafter appended claims.

We claim:

1. A method for converting an image format of n-line, three-dimensional electronic image produced with line polarization into m-line images whose respective, immediately neighboring two lines are respectively polarized in alternation into a first and a second direction upon viewing, wherein all lines polarized in the first direction are employed for the presentation of a first sub-image and all lines polarized in the second direction are employed for the presentation of a second sub-image, given that the first and second sub-images are needed for three-dimensional viewing, the method comprising the steps of:

abbreviating as a whole number a fraction formed of the values n and m having the form m/n to form m'/n';

dividing the lines of the image to be converted into first groups having a respective line plurality n';

combining two of the first groups which abut one another to respective second groups, wherein a last first group remaining by itself is combined with an imaginary dummy group of the same size having another but dummy lines to form a last second group;

determining |p| lines to be inserted, if m'>n', twice per respective second group in the conversion according to an equation |p|=|m'−n'|;

determining |p| lines to be skipped, if m'<n', twice per respective second group in the conversion according to the equation |p|=|m'−n'|;

inserting |p| lines, if m'>n', twice in each of the second group wherein two successive lines are always affected by an insertion and, given an odd-numbered |p|, the last line not yet affected by an insertion is affected by an insertion in the one first group in a meeting area of the first groups abutting one another in a respective second group, and the first line not yet affected by an insertion is affected by an insertion in the other group;

[inserting] *skipping* |p| lines, if [m'>n'] *m'<n'*, twice in each of the second group wherein two successive lines are always affected by a skipping and, given an odd-numbered |p|, the last line not yet affected by a skipping is affected by a skipping in the one first group in a meeting area of the first groups abutting one another in a respective second group, and the first line not yet affected by a skipping is affected by a skipping in the other group; and transposing with one another in sequence the two inward lines of the four-line groups respectively arising after an addition of lines in two successive lines of the second group.

2. A method for converting an image format as claimed in claim 1, wherein the inserted lines are copied from preceding or following lines.

3. A method for converting an image format as claimed in claim 1, wherein the inserted lines are interpolated from preceding and succeeding lines.

4. A method for converting an image format as claimed in claim 1, wherein the lines within a second group affected by an insertion or a skipping are selected uniformly distributed within the respective second group.

5. A method for converting an image format as claimed in claim 1, wherein the lines polarized in the one direction are shifted relative to one another in a plane compared to the lines polarized in the other direction.

6. A method for converting an image format as claimed in claim 1, further comprising the step of:

setting a mode, wherein each even-numbered or odd-numbered line is overwritten with the content of a preceding line, for switching from a three-dimensional image to a two-dimensional image.

7. A circuit for presenting a three-dimensional image electronically generated upon application of a line polarization method from a video signal adjacent an input, the circuit comprising:

a frequency converter having a set frequency which defines a plurality of presented lines;

at least one parallel delay line exhibiting an independent delay value and having a controlled switch for activating or deactivating the respective delay line provided for the image presentation; and control electronics for controlling switches, wherein image lines are transposed as warranted and controls for the switches of the delay lines are provided.

8. A circuit for presenting a three-dimensional image electronically generated upon application of a line polarization method from a video signal adjacent an input, the circuit comprising:

a digital write-read memory for simultaneously storing at least one three-dimensional image in digital form; and a controller circuit, the controller circuit for fetching the stored images at a rate dependent on the storing, wherein stored lines are read out in a different sequence and forwarded for image presentation.

* * * * *